(12) United States Patent
VanDeusen

(10) Patent No.: US 11,508,194 B1
(45) Date of Patent: Nov. 22, 2022

(54) POSITION KEYED LOCKBOX

(71) Applicant: Jeffrey Scott VanDeusen, Raymore, MO (US)

(72) Inventor: Jeffrey Scott VanDeusen, Raymore, MO (US)

(*) Notice: Subject to any disclaimer, the term of this patent is extended or adjusted under 35 U.S.C. 154(b) by 0 days.

(21) Appl. No.: 17/407,229

(22) Filed: Aug. 20, 2021

Related U.S. Application Data

(60) Provisional application No. 63/183,046, filed on May 2, 2021.

(51) Int. Cl.
*G07C 9/00* (2020.01)
*G07C 9/28* (2020.01)
*H04W 4/029* (2018.01)
*E05B 15/02* (2006.01)

(52) U.S. Cl.
CPC .......... *G07C 9/00182* (2013.01); *G07C 9/28* (2020.01); *H04W 4/029* (2018.02); *E05B 15/02* (2013.01)

(58) Field of Classification Search
CPC ........ G07C 2009/0092; G07C 9/00182; G07C 9/28; H04W 4/029; E05B 15/02
See application file for complete search history.

(56) References Cited

U.S. PATENT DOCUMENTS

| | | | | |
|---|---|---|---|---|
| 5,459,666 A * | 10/1995 | Casper | ................... | G01C 23/00 701/123 |
| 5,760,703 A * | 6/1998 | Becker | ............... | G07C 9/00182 235/382 |
| 6,725,127 B2 * | 4/2004 | Stevens | ................ | A47G 29/141 700/226 |
| 7,034,683 B2 * | 4/2006 | Ghazarian | .............. | G08B 13/06 340/568.1 |
| 10,769,875 B2 * | 9/2020 | Arellano | ............... | G08B 13/196 |
| 2001/0015691 A1 * | 8/2001 | Mellen | ............... | G07C 9/00857 340/8.1 |
| 2002/0145505 A1 * | 10/2002 | Sata | ......................... | G07C 9/10 340/541 |
| 2004/0154715 A1 * | 8/2004 | Dufournier | ............. | B60C 11/24 340/425.5 |
| 2005/0212671 A1 * | 9/2005 | Auerbach | ............... | G07C 11/00 340/539.1 |
| 2007/0018787 A1 * | 1/2007 | Martinez de Velasco Cortina ..... | | G07C 9/28 340/5.61 |
| 2007/0227913 A1 * | 10/2007 | Shoenfeld | ................ | E05B 63/24 206/1.5 |
| 2008/0052044 A1 * | 2/2008 | Shoenfeld | .......... | G07C 9/00896 229/300 |
| 2008/0191867 A1 * | 8/2008 | Markovich | ......... | G07C 9/00912 340/539.11 |
| 2010/0251785 A1 * | 10/2010 | Zarei | ....................... | E05B 47/02 70/57.1 |
| 2011/0041573 A1 * | 2/2011 | Giles | ......................... | G07C 9/30 70/278.1 |
| 2011/0175730 A1 * | 7/2011 | Stevenson | .......... | G07C 9/00912 340/5.73 |
| 2015/0005934 A1 * | 1/2015 | Bell | ...................... | A61J 7/0084 700/242 |

(Continued)

*Primary Examiner* — Curtis J King

(74) *Attorney, Agent, or Firm* — Hovey Williams LLP

(57) ABSTRACT

A position keyed lockbox is unlocked by geographical location data or other positional data and includes an enclosure, a locking mechanism, and a control system. The control system unlocks the lockbox when the lockbox is taken to a location that matches a pre-selected location stored in the memory.

19 Claims, 8 Drawing Sheets

(56) References Cited

U.S. PATENT DOCUMENTS

| | | | | |
|---|---|---|---|---|
| 2015/0233722 | A1* | 8/2015 | Faaborg | G01C 21/3626 |
| | | | | 340/995.27 |
| 2017/0096279 | A1* | 4/2017 | Campalans | B65D 81/2076 |
| 2018/0228311 | A1* | 8/2018 | Bloom | G07C 9/00912 |
| 2018/0330325 | A1* | 11/2018 | Sibley | B66F 9/063 |
| 2019/0034859 | A1* | 1/2019 | Kim | G07C 9/00896 |
| 2019/0088054 | A1* | 3/2019 | Wulf | G07C 9/00896 |
| 2019/0122473 | A1* | 4/2019 | Foot | H04W 4/35 |
| 2019/0244455 | A1* | 8/2019 | Kim | G07C 9/00182 |
| 2019/0259000 | A1* | 8/2019 | Buckhalt | G06Q 10/08355 |
| 2020/0077826 | A1* | 3/2020 | Chenier | G07C 9/00912 |
| 2020/0151982 | A1* | 5/2020 | Shell | G06Q 10/0832 |
| 2020/0165861 | A1* | 5/2020 | Bruno | A45C 3/00 |
| 2020/0189808 | A1* | 6/2020 | Bilinski | G07C 9/00896 |
| 2020/0242548 | A1* | 7/2020 | Curry | G06Q 10/0832 |
| 2020/0401995 | A1* | 12/2020 | Aggarwala | G07C 9/27 |
| 2021/0287168 | A1* | 9/2021 | Arora | G06Q 10/0832 |
| 2022/0055809 | A1* | 2/2022 | Polycarpe | B65D 55/14 |

* cited by examiner

POSITION KEYED LOCKBOX

RELATED APPLICATION

This application claims priority to Provisional Application No. 63/183,046, filed May 2, 2021, entitled POSITION KEYED LOCKBOX, which is hereby incorporated by reference into the present application in its entirety.

BACKGROUND

Lockboxes, safes, and other secured enclosures are typically locked and unlocked with physical keys, keypads, or RFID readers. Unfortunately, keys and RFID tags are often lost or misplaced and keypad codes are difficult to remember. Accordingly, there is a need for a lockbox or similar secured enclosure with an improved locking mechanism.

SUMMARY

The present invention solves the above-described problems and provides a distinct advance in the art by providing a position keyed lockbox that is unlocked by geographical location data or other positional data.

A lockbox constructed in accordance with an embodiment of the invention broadly comprises a secured enclosure, a locking mechanism, and a control system. The enclosure includes at least one internal compartment and a closeable lid or door. The locking mechanism may include a bolt or other mechanism and an electromechanical actuator that shifts the bolt between a locked state and an unlocked state under the direction of the control system.

An embodiment of the control system comprises a location-determining component, a memory element, and a computing device. The location-determining component is operable to determine current locations of the lockbox, and in one embodiment, is a GPS receiver. The memory stores data representative of at least one pre-selected geographic location. The computing device monitors current locations of the lockbox as determined by the location-determining component and triggers the locking mechanism to unlock the lockbox only when the lockbox is taken to a location that matches the pre-selected location stored in the memory.

In other embodiments, data representative of a plurality of preselected geographic locations may be stored in the memory. The computing device is programmed to trigger the locking mechanism to unlock the lockbox only when the lockbox is taken to locations that match all the pre-selected locations. In some embodiments, the lockbox must be taken to the pre-selected locations in a particular order to trigger its unlocking.

In other embodiments, the enclosure includes multiple internal compartments and multiple shiftable lids, one for each internal compartment, and a locking mechanism for each of the lids. The memory stores a plurality of preselected geographic locations, with each of the preselected geographic locations being associated with one of the lids. The computing device is operable to unlock each lid only after the lockbox is taken to a location that matches the preselected location associated with the lid. Thus, the contents of a first compartment of the lockbox may be retrieved after the lockbox is taken to a first location, the contents of a second compartment of the lockbox may be retrieved after the lockbox is taken to a second location, etc.

In still other embodiments, positional data other than geographic location data may be stored in the memory and considered by the computing device to unlock the lockbox. For example, in one embodiment, data representative of a preselected speed is stored in the memory, and the computing is programmed to trigger the locking mechanism to unlock the lockbox when the lockbox is travelling at a speed that matches the preselected speed. In other embodiments, the positional data used to unlock the lockbox may be an altitude of the lockbox or distance travelled by the lockbox.

Embodiments of the lockbox may also comprise a user interface for inputting the pre-selected geographic locations and/or other preselected data into the memory; progress indicators for indicating the progress of an unlocking procedure; a GPS lock indicator; an internal power supply; and an ON/OFF switch.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
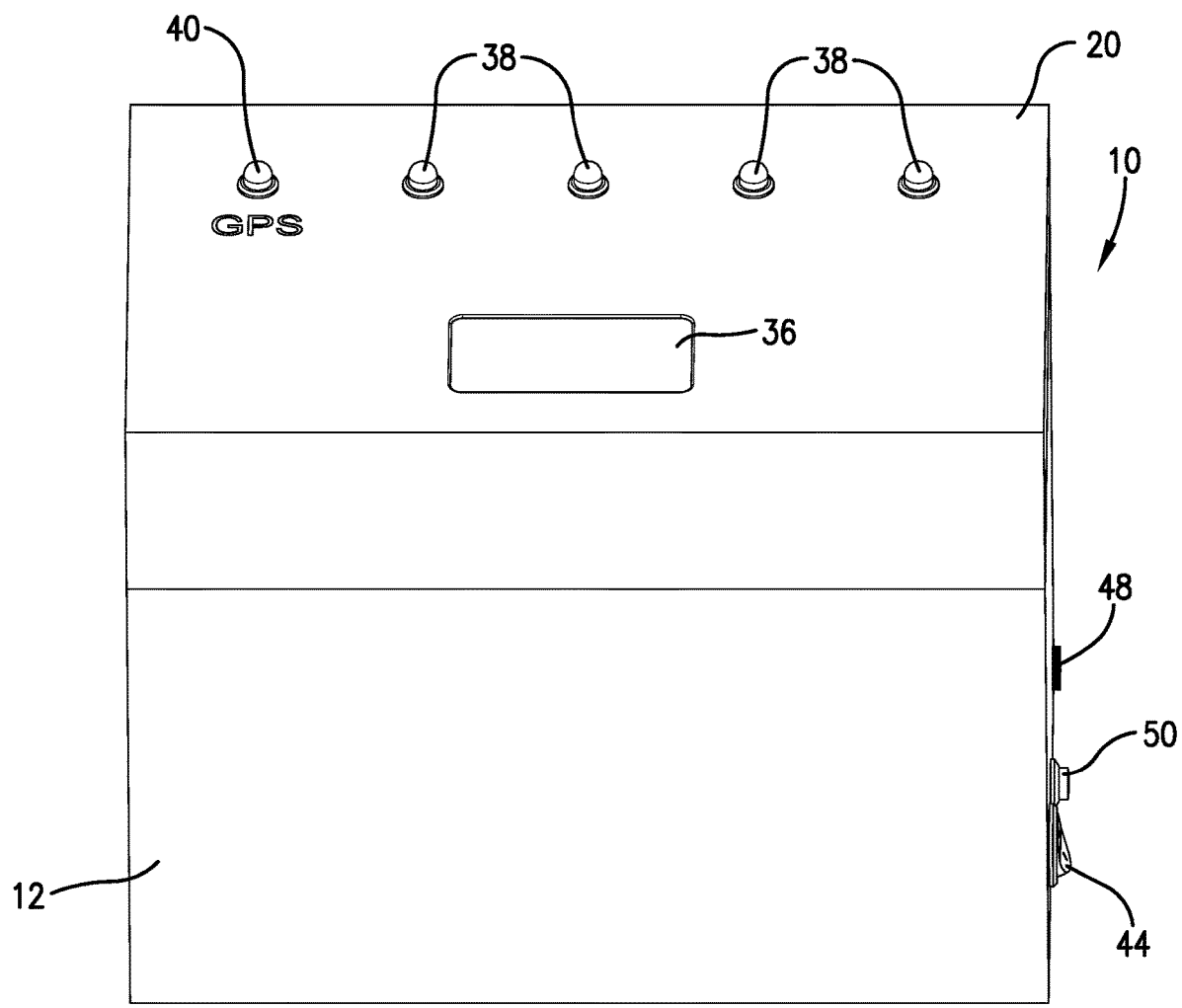
FIG. 1 is a front perspective view of a lockbox constructed in accordance with an embodiment of the invention shown with its lid closed and locked.
Figure 2:
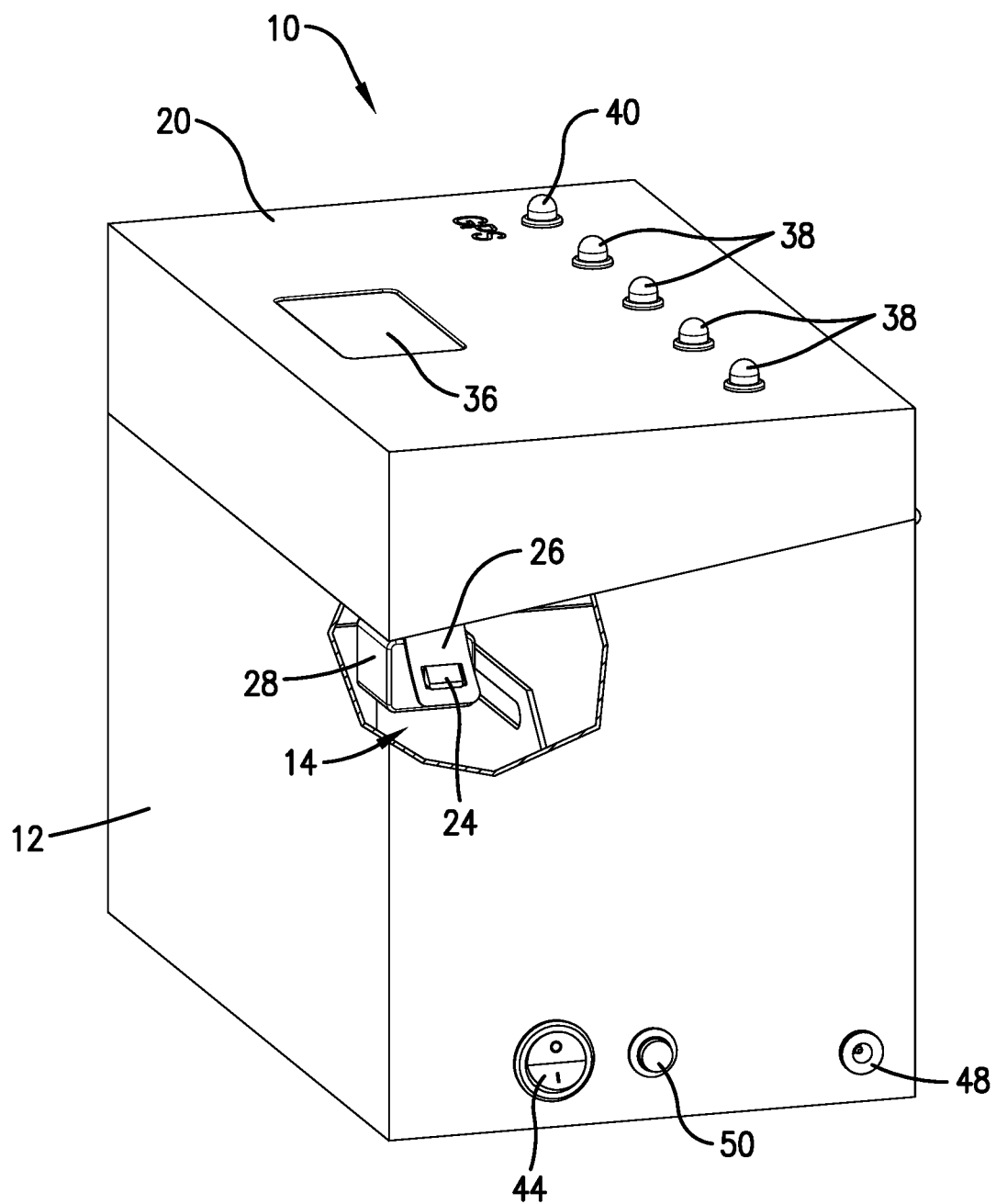
FIG. 2 is a side perspective view of the lockbox with portions broken away to reveal the locking mechanism.
Figure 3:
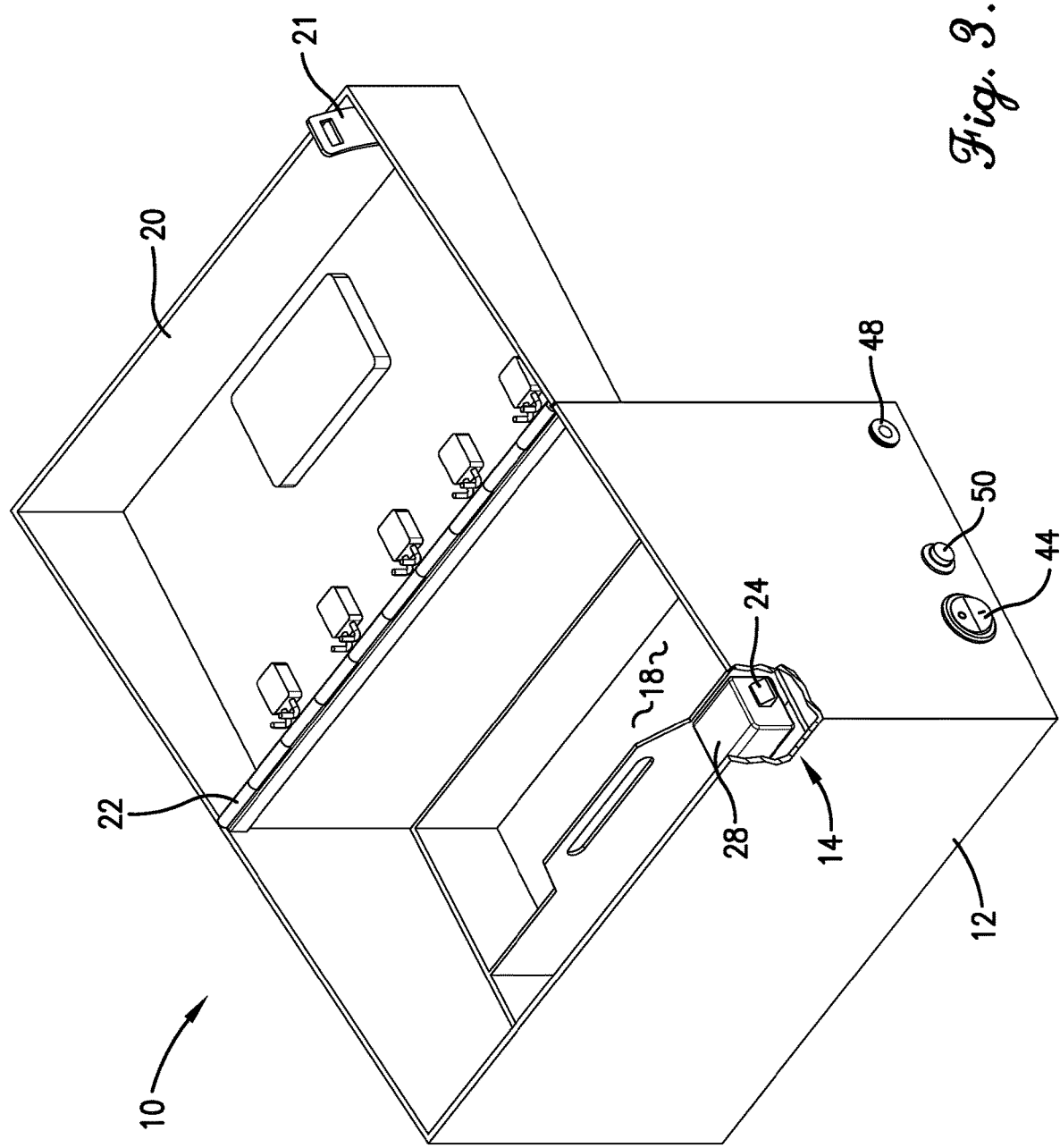
FIG. 3 is a perspective view of the lockbox shown with its lid opened with portions broken away to reveal the locking mechanism.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention provides a position keyed lockbox that is unlocked with geographical location data or other positional data. An embodiment of the lockbox 10 is depicted in FIGS. 1-4 and broadly comprises an enclosure 12, a locking mechanism 14, and a control system 16.

The enclosure 12 may be any size and made of metals or any other high strength materials. The enclosure 12 includes at least one internal compartment 18 in which jewels, money, or other valuable items may be stored and a closeable lid 20 for providing access to the compartment. The lid 20 may be attached to the top, side, or bottom of the enclosure by internal hinges 22 and may be shifted between a closed position illustrated in FIGS. 1 and 2 and an opened position illustrated in FIG. 3. Other embodiments of the lockbox described below may include more than one internal compartment and lid.

The locking mechanism 14 locks and unlocks the lid 20 under the control of the control system 16 as described in more detail below. In one embodiment, the locking mechanism 14 includes a bolt 24 or other shiftable mechanism; a strike plate 26 for receiving the bolt; and an electromechanical actuator 28 that shifts the bolt in and out of the strike plate between a locked state in which it locks the lid and an unlocked state in which it allows the lid to be opened.

Figure 4:
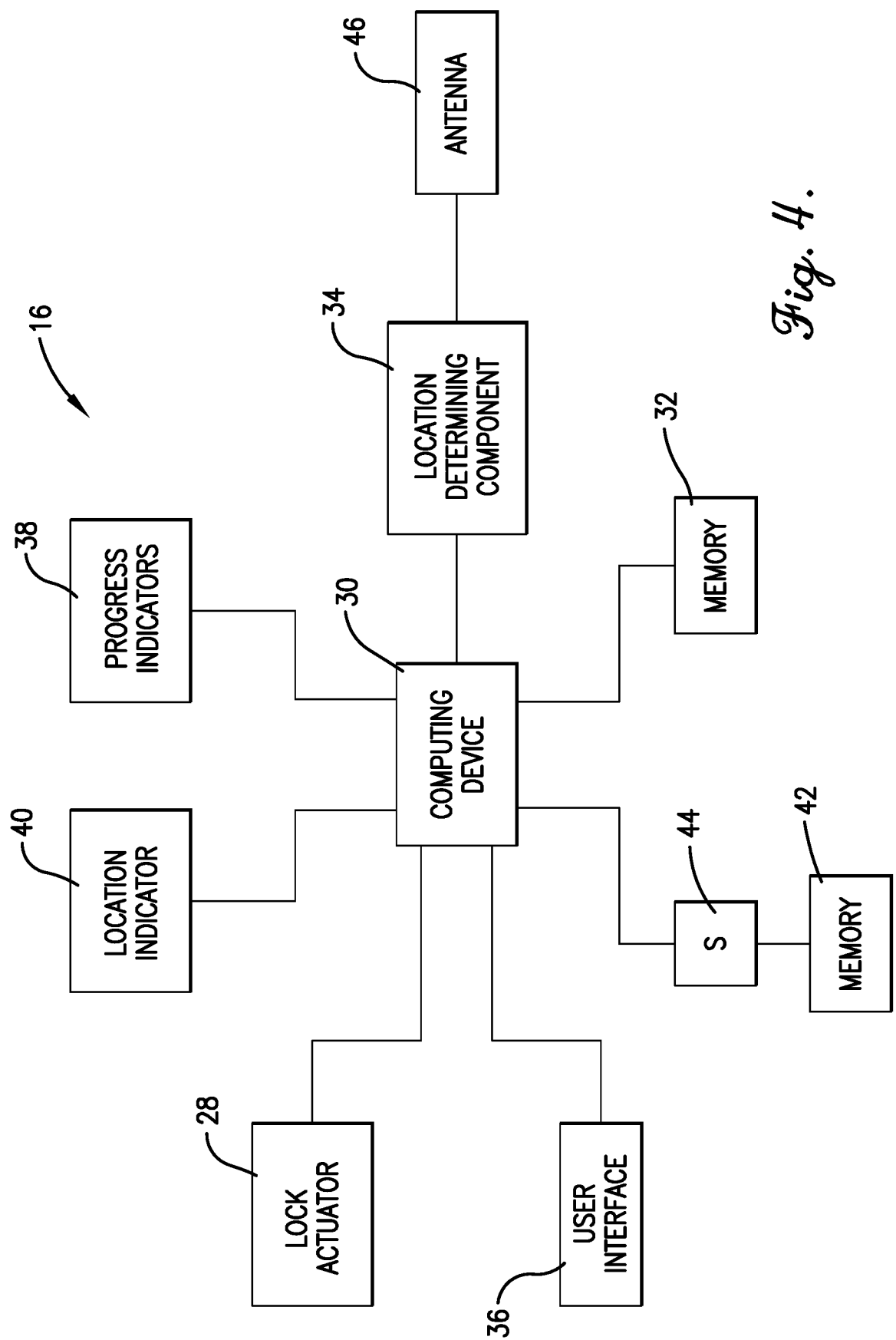
FIG. 4 is a schematic diagram of a control system of the lockbox.

The control system 16 controls operation of the lockbox and can be implemented with hardware, software, firmware, or a combination thereof. An exemplary control system 16 is illustrated in FIG. 4 and comprises a computing device 30, a memory element 32, a location-determining component 34, a user interface 36; progress indicators 38; a location lock indicator 40, a power source 42, and an ON/OFF switch 44.

The computing device 30 may comprise or include any number or combination of processors, controllers, ASICs, computers, or other control circuitry. As illustrated in FIG. 4, the computing device 30 includes data inputs for receiving data from the memory 32, the location-determining component 34, and the user interface 36 and outputs for transmitting instructions and/or data to the lock actuator 28, the progress indicators 38, the location lock indicator 40, and the memory 32.

Some of the control functions performed by the computing device 30 may be implemented with one or more computer programs executed by the computing device 30 or other computing devices that can transmit data to the lockbox. Each computer program comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate, or transport the program for use by or in connection with the instruction execution system, apparatus, or device including, but not limited to, the memory 32. The computer-readable medium can be, for example, but not limited to, an electronic, magnetic, optical, electro-magnetic, infrared, or semiconductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

The memory 32 may be any electronic memory that can be accessed by the computing device 30 and operable for storing instructions or data. The memory 32 may be integral with the computing device 30 or may be external memory accessible by the computing device. The memory 32 may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory 32 may communicate directly with the computing device 30 or may communicate over a bus or other mechanism that facilitates direct or indirect communication. The memory 32 may optionally be structured with a file system to provide organized access to data existing thereon.

The location-determining component 34 may be any device capable of determining geographical locations of the lockbox 10 and other positional data related to the lockbox such as the speed and altitude of the lockbox or the distance the lockbox has been transported over a period of time. The location-determining component 34 may be a global navigation satellite system (GNSS) receiver such as a GPS receiver, Glonass receiver, Galileo receiver, or other receiver operable to receive navigational signals from satellites to calculate positions of the lockbox as a function of the signals. The GNSS receiver may include one or more processors, controllers, or other computing devices and memory for storing information accessed and/or generated by the processors or other computing devices. As shown in FIG. 4, the GNSS receiver may be coupled with an antenna 46 such as a patch antenna, helical antenna, or any other type of antenna.

The location-determining component 34 may also comprise other types of receiving devices capable of receiving location information from at least three transmitting locations and performing basic triangulation calculations to determine the relative position of the receiving device with respect to the transmitting locations. For example, signals from cellular towers or any customized transmitting radio frequency towers can be used instead of signals from satellites. With such a configuration, any standard geometric triangulation algorithm can be used to determine the exact location of the receiving unit.

The user interface 36 may be any device that permits a user to enter information into the computing device 30 or the memory 32. For example, the user interface may include a touchscreen display, conventional input devices such as knobs, buttons, switches, dials, etc.; inputs for receiving programs and data from external devices; one or more keypads and displays; a cellular or other radio transceiver for wirelessly receiving and transmitting data from and to remote devices; a Bluetooth transceiver; a Wi-Fi transceiver; and/or other electronic components.

The progress indicators 38 indicate the progress or status of an unlocking procedure as described below and may by LEDs or any other indicators. The lockbox is shown with four progress indicators, but any number may be provided. In one embodiment, the number of progress indicators match the number of preselected locations stored in the memory 32 as explained below.

The location lock indicator 40 indicates when the control system has locked onto a GPS signal or other location signal and may also be an LED or other indicator.

The power source 42 may be a rechargeable battery and is electrically coupled to the other components of the control system 16 via the On/Off switch 44. A charging connector 48 may be mounted on the side of the enclosure for re-charging the power source.

Some or all of the components of the control system 16 may be supported on a circuit board that is enclosed in the enclosure of the lockbox. The components of the control system 16 need not be physically connected to one another since wireless communication among the various depicted components is permissible and intended to fall within the scope of the present invention. Thus, portions of the control system 16 may be located remotely from the lockbox and from each other.

Use of the lockbox 10 will now be described. Data representative of at least one pre-selected geographic location is stored in the memory 32. The data may be entered via the user interface 36 or may be gathered by taking the lockbox 10 to the pre-selected locations, acquiring location data with the location-determining component, then storing the data in the memory.

Valuables may then be placed in the interior compartment 18 of the lockbox and secured therein by closing the lid 20 and triggering the locking mechanism 14 to lock the lid. The locking mechanism may be triggered to its locking position by a switch 50 on the side of the enclosure.

To subsequently unlock the locking mechanism 14, the lockbox 10 must be taken to the pre-selected locations. The computing device 30 polls the location-determining component 34, compares current locations of the lockbox as determined by the location-determining component to the pre-selected geographic locations, and triggers the actuator of the locking mechanism to unlock the lockbox only when the lockbox is taken to locations that match the pre-selected locations.

In one embodiment, data for only one preselected location is stored in the memory 32, and the computing device 30 unlocks the locking mechanism 14 when the lockbox is taken to this one geographic location. In other embodiments, data for a plurality of preselected geographic locations may be stored in the memory 32, and the computing device 30 is programmed to trigger the locking mechanism to unlock the lockbox only when the lockbox is taken to locations that match all the pre-selected locations.

In still other embodiments, positional data other than geographic location data may be considered by the computing device 30 to unlock the lockbox. For example, in one embodiment, data representative of a preselected speed is stored in the memory, and the computing device 30 is programmed to trigger the locking mechanism 14 to unlock the lockbox when the lockbox is travelling at a speed that matches the preselected speed. In other embodiments, the positional data used to unlock the lockbox may be altitude or distance travelled. In these embodiments, the computing device may be programmed to unlock the lockbox only if the preselected speed or altitude is matched for at least a pre-determined time period such as 30 seconds.

Figure 5:
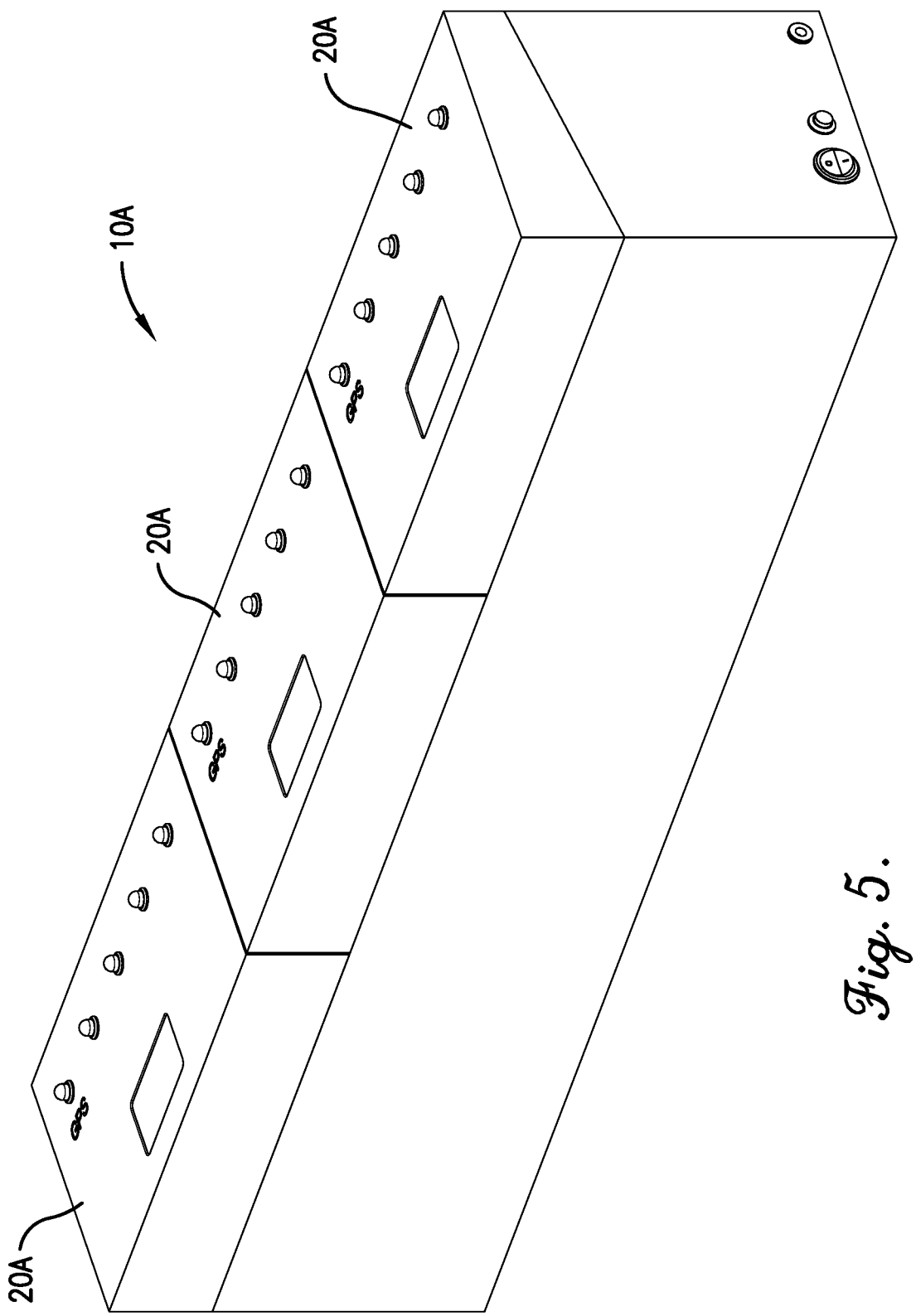
FIG. 5 is a front perspective view of a lockbox constructed in accordance with another embodiment of the invention shown with its lid closed and locked.
Figure 6:
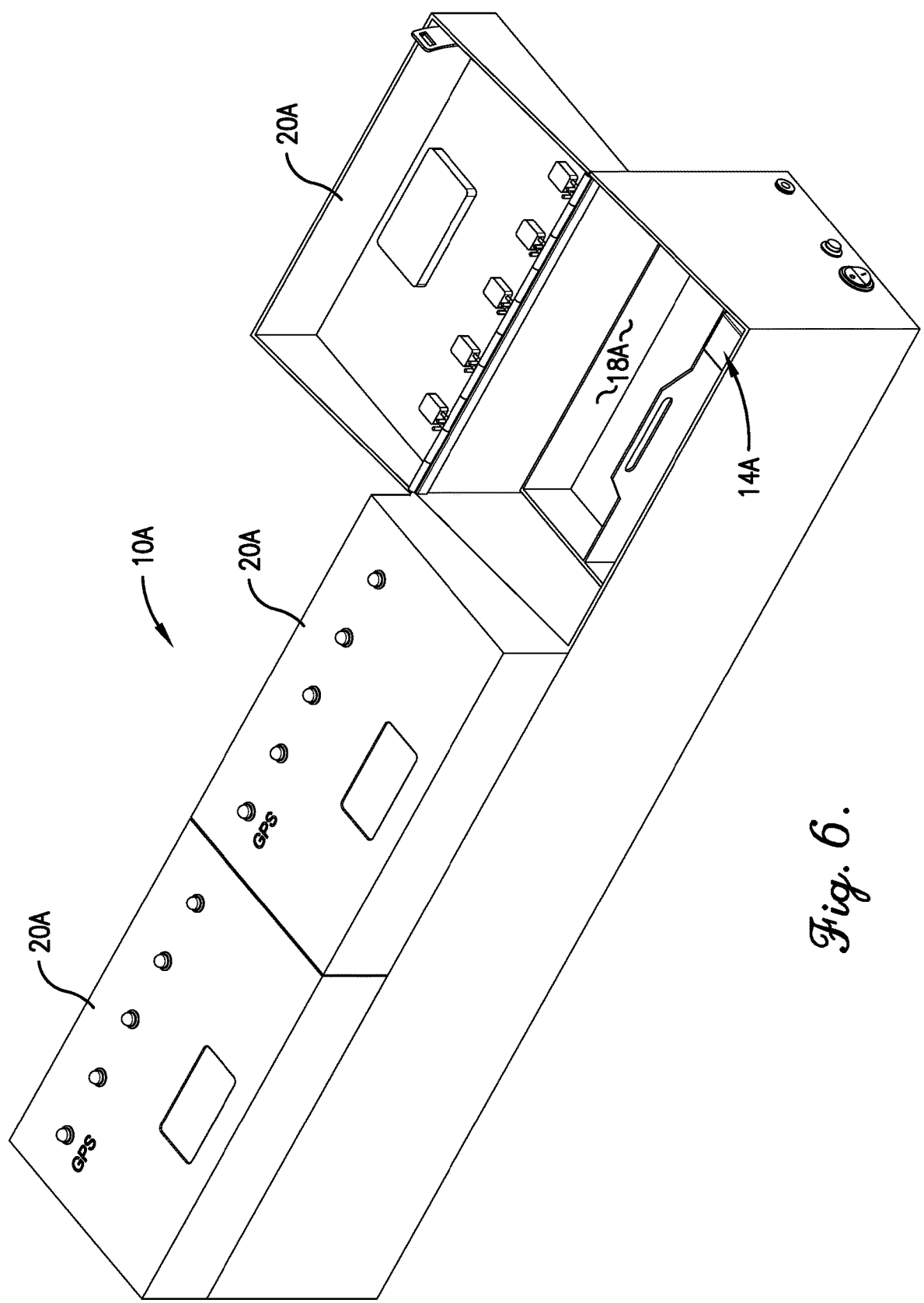
FIG. 6 is a perspective view of the lockbox of FIG. 5 with one of its lids opened.
Figure 7:
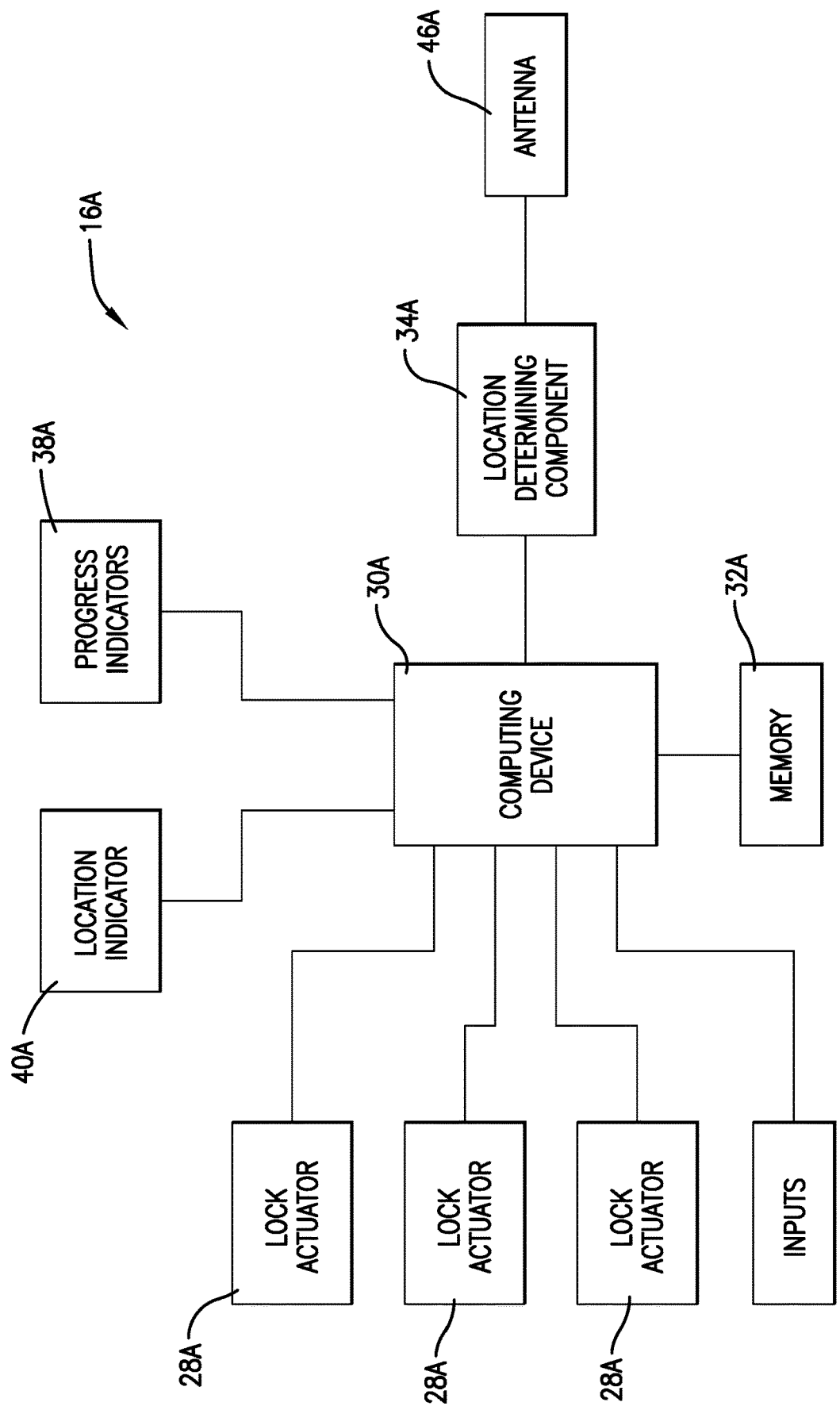
FIG. 7 is a schematic diagram of a control system of the lockbox of FIG. 5.

FIGS. 5-7 depict a lockbox 10A constructed in accordance with another embodiment of the invention. Only the portions of the lockbox 10A that differ from the lockbox 10 will be described in detail. The lockbox 10A includes an enclosure 12A with multiple internal compartments 18A, multiple shiftable lids 20A, one for each internal compartment, and a locking mechanism 14A for each of the lids. Each locking mechanism includes its own lock actuator 28A.

As shown in FIG. 7, the lockbox 10A includes a control system 16A that comprises a computing device 30A, a memory element 32A, a location-determining component 34A, a user interface 36A; progress indicators 38A; and a location lock indicator 40A. The control system 16A may also comprise a power source and an ON/OFF switch.

The memory 32A stores a plurality of preselected geographic locations, with each of the preselected geographic locations being associated with one of the lids. The computing device 30A is operable to unlock each lid only after the lockbox is taken to a location or locations that match the pre-selected location or locations associated with the lid. For example, a first lid may be unlocked such that the contents of a first compartment of the lockbox may be retrieved after the lockbox is taken to a first location, a second lid may be unlocked such that the contents of a second compartment of the lockbox may be retrieved after the lockbox is taken to a second location, and a third lid may be unlocked such that the contents of a third compartment of the lockbox may be retrieved after the lockbox is taken to a third location. etc.

Figure 8:
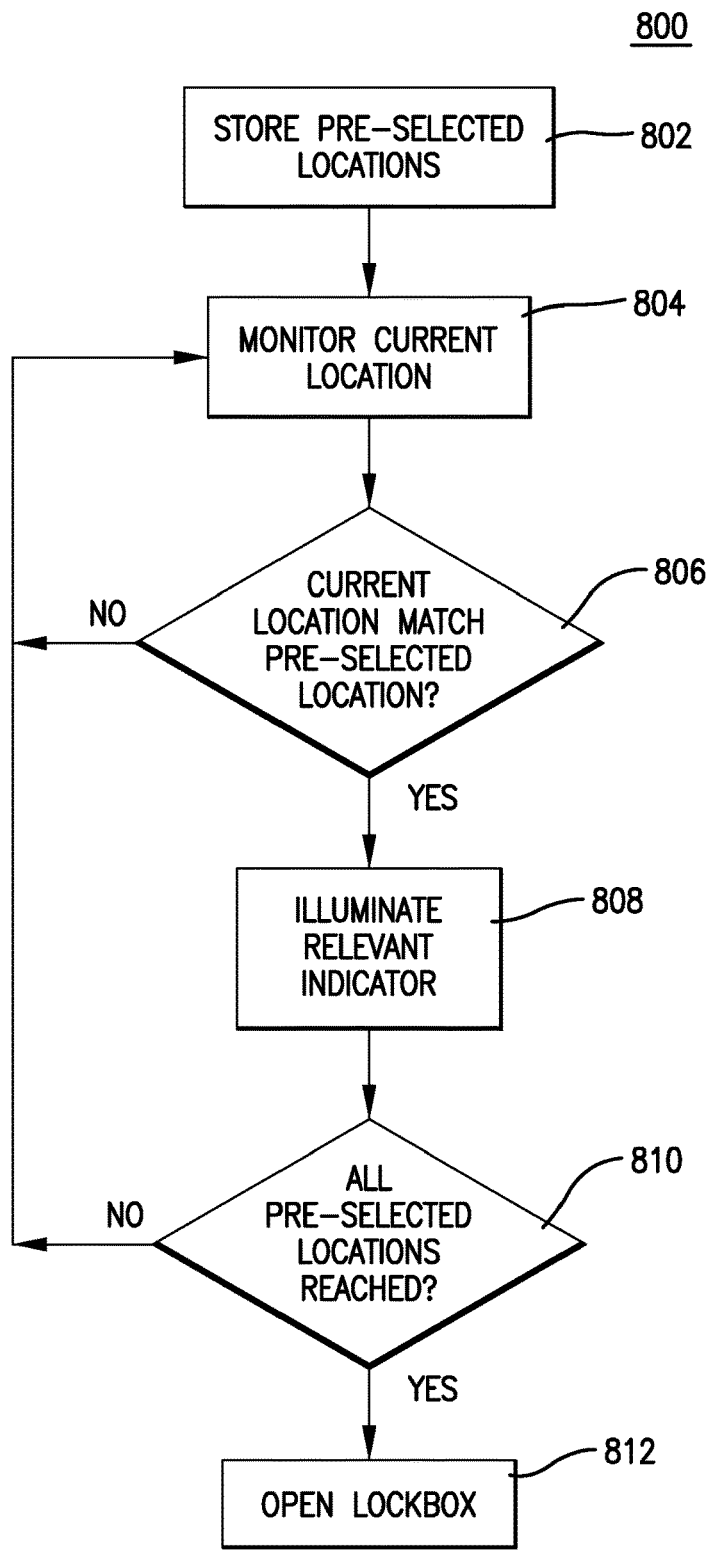
FIG. 8 is a flow diagram depicting exemplary steps of methods of the present invention and/or portions of computer programs of the present invention.

The flow chart of FIG. 8 shows exemplary implementations of the present invention. In this regard, some of the boxes of the flow chart may represent steps in methods of the practicing the invention. The flow chart may also represent portions of one or more computer programs of the present invention, each of which comprises one or more executable instructions for implementing the specified logical function or functions.

In some alternative implementations, the functions noted in the various boxes may occur out of the order depicted in FIG. 8. For example, two boxes shown in succession in FIG. 8 may in fact be executed substantially concurrently, or the boxes may sometimes be executed in the reverse order depending upon the functionality involved. The methods and computer programs may be implemented with the embodiments of lockbox 10, 10A shown in FIGS. 1-7 or with other similar devices.

As shown in box 802, geographic coordinates for one or more pre-selected locations are first stored in a memory device such as the memory 32 of the lockbox 10. In other embodiments, data representative of pre-selected positional states such as speed, altitude, and/or distance traveled may be stored instead of or along with the pre-selected locations. The data may be entered with the user interface 36 or gathered automatically when the lockbox is taken to the pre-selected locations.

As shown in box 804, the location-determining component 34 monitors current locations of the lockbox 10. The indicator 40 is illuminated when the location-determining component locks onto a navigation signal.

As shown in box 806, the computing device 30 determines if the current location of the lockbox matches one of the preselected locations. If it does not, the method or computer program returns to box 804. If it does, the method or computer program proceeds to box 808. In other embodiments, the computing device 30 determines if the current positional state matches one of the preselected positional states in box 806.

As shown in box 808, the computing device 30 triggers one of the progress indicators if the current location of the device matches one of the preselected locations or if the current positional state matches one of the preselected positional states.

In box 810, the computing device 30 determines if all the preselected locations or preselected positional states have been matched. For example, the computing device 30 determines if the lockbox or other device has been transported to all of the preselected locations. If the answer is No, the method or computer program returns to box 806. If Yes, the method or computer program proceeds to box 812.

In box 812, the computing device opens the lockbox 10 by trigging the lock actuator 28. In other embodiments, the computing device may open selected compartments within the lockbox as selected locations are reached and/or selected positional states are reached. In still other embodiments, the computing device may open one compartment within the lockbox when it is taken to a pre-selected location, open another compartment when the lockbox is transported at a pre-selected speed, and open yet another compartment when the lockbox is taken to a pre-selected altitude.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a computing device or processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or "computing device" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A lockbox comprising:
   an enclosure with at least one internal compartment and a lid shiftable between an open position in which the compartment may be accessed and a closed position in which the compartment cannot be accessed;
   a locking mechanism shiftable between a locked state in which it locks the lid in the closed position and an unlocked state in which it allows the lid to be shifted to the open position; and
   a control system comprising—
      a location-determining component operable to determine current locations of the lockbox;
      memory for storing data representative of a plurality of pre-selected geographic locations;
      a computing device coupled with the locking mechanism, the location-determining component, and the memory and operable to shift the locking mechanism to the unlocked state when the lockbox is taken to locations that match all the pre-selected locations.

2. The lockbox of claim 1, further comprising a plurality of progress indicators, wherein each progress indicator is associated with one of the preselected geographic locations, and wherein the computing device triggers illumination of each progress indicator when the lockbox is taken to a location that matches the pre-selected location associated with the progress indicator.

3. The lockbox of claim 1, further comprising a user interface coupled with the computing device for inputting the data representative of the pre-selected geographic locations.

4. The lockbox of claim 1, wherein the enclosure comprises a plurality of internal compartments and a plurality of lids, one for each internal compartment, wherein the lockbox comprises a plurality of locking mechanism, wherein each locking mechanism is associated with one of the lids.

5. The lockbox of claim 4, wherein each of the preselected geographic locations is associated with one of the internal compartments, and wherein the computing device is operable to shift the locking mechanism for each internal compartment to the unlocked state only after the lockbox is taken to a location that matches the pre-selected location associated with the internal compartment.

6. The lockbox of claim 1, wherein the memory identifies the plurality of preselected geographic locations in a particular order, and wherein the computing device is operable to shift the locking mechanism to the unlocked state only after the lockbox is taken to locations that match the pre-selected locations in the particular order.

7. The lockbox of claim 1, wherein the locking mechanism comprises a latch, a strike plate, and an actuator for shifting the latch in an out of the strike plate.

8. A lockbox comprising:
   an enclosure with at least one internal compartment and a lid shiftable between an open position in which the compartment may be accessed and a closed position in which the compartment cannot be accessed;
   a locking mechanism shiftable between a locked state in which it locks the lid in the closed position and an unlocked state in which it allows the lid to be shifted to the open position; and
   a control system comprising—
      a GPS receiver operable to determine current locations of the lockbox;
      memory for storing data representative of a plurality pre-selected geographic locations;
      a computing device coupled with the locking mechanism, the location-determining component, and the memory and operable to shift the locking mechanism to the unlocked state when the lockbox is taken to locations that match all the pre-selected locations.

9. The lockbox of claim 8, further comprising a plurality of progress indicators, wherein each progress indicator is associated with one of the preselected geographic locations, and wherein the computing device triggers illumination of each progress indicator when the lockbox is taken to a location that matches the pre-selected location associated with the progress indicator.

10. The lockbox of claim 8, further comprising a user interface coupled with the computing device for inputting the data representative of the pre-selected geographic locations.

11. The lockbox of claim 8, wherein the plurality of preselected geographic locations are identified in a particular order, and wherein the computing device is operable to shift the locking mechanism to the unlocked state only after the lockbox is taken to locations that match the pre-selected locations in the particular order.

12. The lockbox of claim 8, wherein the locking mechanism comprises a latch, a strike plate, and an actuator for shifting the latch in an out of the strike plate.

13. A lockbox comprising:
   an enclosure with at least one internal compartment and a lid shiftable between an open position in which the compartment may be accessed and a closed position in which the compartment cannot be accessed;
   a locking mechanism shiftable between a locked state in which it locks the lid in the closed position and an unlocked state in which it allows the lid to be shifted to the open position; and a control system comprising—
- a positional-determining component operable to determine a positional state of the lockbox;
- memory for storing data representative of a pre-selected positional state;
- a computing device coupled with the locking mechanism, the positional-determining component, and the memory and operable to shift the locking mechanism to the unlocked state when the positional-determining component determines the positional state matches the pre-selected positional state.

14. The lockbox of claim 13, wherein the positional state is a speed.

15. The lockbox of claim 13, wherein the positional state is an altitude.

16. The lockbox of claim 13, wherein the positional state is a distance traveled.

17. The lockbox of claim 13, wherein the memory stores data representative of a plurality of preselected positional states, and wherein the positional-determining component determine a plurality of positional states as the lockbox is moved, and wherein the computing device is operable to shift the locking mechanism to the unlocked state only after the positional states match all the preselected positional states.

18. The lockbox of claim 17, further comprising a plurality of progress indicators, wherein each progress indicator is associated with one of the preselected positional states, and wherein the computing device triggers illumination of each progress indicator when one of the positional states matches the pre-selected positional state associated with the progress indicator.

19. The lockbox of claim 18, wherein the locking mechanism comprises a latch, a strike plate, and an actuator for shifting the latch in an out of the strike plate.

* * * * *